United States Patent
Alpay et al.

(10) Patent No.: US 10,049,775 B2
(45) Date of Patent: Aug. 14, 2018

(54) STEAM SEPARATION SYSTEM AND NUCLEAR BOILING WATER REACTOR INCLUDING THE SAME

(71) Applicants: Bulent Alpay, Wilmington, NC (US); Adrian M. Mistreanu, Wilmington, NC (US); Phillip Glen Ellison, Wilmington, NC (US); Bobby Glen Malone, Wilmington, NC (US); John S. Bennion, Wilmington, NC (US); Michael L. James, Wilmington, NC (US)

(72) Inventors: Bulent Alpay, Wilmington, NC (US); Adrian M. Mistreanu, Wilmington, NC (US); Phillip Glen Ellison, Wilmington, NC (US); Bobby Glen Malone, Wilmington, NC (US); John S. Bennion, Wilmington, NC (US); Michael L. James, Wilmington, NC (US)

(73) Assignee: GE-Hitachi Nuclear Energy Americas LLC, Wilmington, NC (US)

(*) Notice: Subject to any disclaimer, the term of this patent is extended or adjusted under 35 U.S.C. 154(b) by 1270 days.

(21) Appl. No.: 14/264,279

(22) Filed: Apr. 29, 2014

(65) Prior Publication Data

US 2015/0310944 A1 Oct. 29, 2015

(51) Int. Cl.
*G21C 15/16* (2006.01)
*B01D 45/04* (2006.01)
*F22B 37/26* (2006.01)

(52) U.S. Cl.
CPC ............. *G21C 15/16* (2013.01); *B01D 45/04* (2013.01); *F22B 37/268* (2013.01); *Y02E 30/31* (2013.01)

(58) Field of Classification Search
CPC .............................. G21C 15/16; F22B 37/268
USPC ........ 376/371; 122/34; 55/462, 465; 95/267, 95/272; 96/134
See application file for complete search history.

(56) References Cited

U.S. PATENT DOCUMENTS

| | | | | |
|---|---|---|---|---|
| 3,570,221 A | * | 3/1971 | Oliver | E21B 43/34 55/418 |
| 3,720,046 A | * | 3/1973 | Kudirka | B01D 45/08 122/34 |
| 4,912,733 A | * | 3/1990 | Gluntz | B04C 3/06 376/371 |
| 2005/0135548 A1 | * | 6/2005 | Ando | G21C 1/084 376/371 |
| 2007/0201604 A1 | | 8/2007 | Chaki et al. | |
| 2010/0055308 A1 | | 3/2010 | Dulka et al. | |

* cited by examiner

*Primary Examiner* — Jack W Keith
*Assistant Examiner* — Sharon M Davis
(74) *Attorney, Agent, or Firm* — Harness, Dickey & Pierce, P.L.C.

(57) ABSTRACT

In one embodiment, the steam separation system includes a plurality of steam separators configured to separate liquid from a gas-liquid two-phase flow stream; and a steam dryer system disposed above the steam separators. The steam dryer system includes a plurality of steam dryer bank assemblies and at least one moisture trap. Each of the steam dryer bank assemblies is configured to separate liquid of the gas-liquid two-phase flow stream exiting the steam separators. The moisture trap is disposed next to one of the steam dryer bank assemblies and is configured to remove liquid from the gas-liquid two-phase flow stream.

17 Claims, 6 Drawing Sheets

STEAM SEPARATION SYSTEM AND NUCLEAR BOILING WATER REACTOR INCLUDING THE SAME

BACKGROUND

Field

Example embodiments relate to a steam separation system and/or a nuclear boiling water reactor (BWR) including the same.

Description of Related Art

A nuclear BWR generates steam by utilizing heat generated from a core and rotates a turbine and a power generator by means of the steam. In a nuclear pressurized water reactor, cooling water separately flows into a primary cooling system circulating through the nuclear reactor, and a secondary cooling system serves as a steam generator. In the primary cooling system, high-temperature water is generated by the heat from the nuclear reactor core. In the secondary cooling system, water in the secondary cooling system is boiled in a heat exchanger in the steam generator to become steam, which rotates a turbine or a power generator.

Regardless of the reactor type, moisture must be removed from the steam supplied to the turbine. To this end, a typical reactor is provided with a plurality of steam separators, dryers and the like so as to remove water from a two-phase flow of steam and water generated in the nuclear reactor or the steam generator.

If the two-phase flow stream (FS) velocity is high and/or steam separator inlet moisture content is high, the number of the minute droplets that are carried by the steam increases, which may result in an increase in moisture carry-over. The increase in moisture carry-over increases the radioactivity levels in the plant and adversely affects outage performance. If the moisture carry-over levels become undesirably high, certain components of the main steam line and turbine can be adversely impacted as a result of enhanced degradation from such mechanisms as flow accelerated corrosion leading to higher maintenance costs.

SUMMARY

At least one embodiment relates to a steam separation system.

In one embodiment, the steam separation system includes a plurality of steam separators configured to separate liquid from a gas-liquid two-phase FS; and a steam dryer system disposed above the steam separators. The steam dryer system includes a plurality of steam dryer bank assemblies and at least one moisture trap. Each of the steam dryer bank assemblies is configured to separate liquid of the gas-liquid two-phase FS exiting the steam separators. The moisture trap is disposed next to one of the steam dryer bank assemblies and is configured to remove liquid from the gas-liquid two-phase FS.

In one embodiment, the moisture trap includes a housing having a plurality of inlet orifices, and an interior of the housing provides a tortuous flow path for the gas-liquid two-phase FS.

In one embodiment, the housing is rectangular box shaped.

In one embodiment, the moisture trap includes at least one plate projecting from one of top and bottom walls of the housing into an interior of the housing to form the tortuous flow path. For example, the moisture trap includes a first plate and a second plate. The first plate projects from the top wall and the second plate projects from the bottom wall, and the second plate is spaced apart from the first plate.

In one embodiment, the housing includes a front wall and a back wall, and a height of the front wall is less than a height of the back wall.

In one embodiment, the housing includes an inlet gap between the top wall and the front wall.

In one embodiment, sizes of the orifices in the top wall increase from the front wall to the back wall.

In one embodiment, the moisture trap includes an exhaust port, and the exhaust port connects to a drain trough of one of the steam dryer bank assemblies.

In one embodiment, the steam dryer system includes a plurality of moisture traps.

In one embodiment, the moisture traps are disposed at an interior surface of the steam dryer system at respective ends of the steam dryer bank assemblies.

In one embodiment, at least one of the steam separators includes a flow diverter at an outlet thereof, the flow diverter configured to divert the gas-liquid two-phase FS exiting the steam separator in a desired direction.

In one embodiment, the desired direction is towards one of the moisture traps.

In one embodiment, the flow diverter has a 3-dimensional surface with a radius of curvature.

In one embodiment, the interior surfaces of the flow diverter, the steam dryer bank assemblies and the moisture traps are coated with an anti-fouling agent.

In one embodiment, at least one of the steam dryer bank assemblies includes a drain trough and a vane assembly disposed on the drain trough. The vane assembly includes chevron-shaped vanes configured to remove moisture from the gas-liquid two-phase FS. The steam dryer bank assemblies further include a hood panel configured to direct the gas-liquid two-phase FS through the vane assembly.

At least one embodiment relates to a nuclear BWR.

In one embodiment, the nuclear BWR includes a reactor pressure vessel; a core in the reactor pressure vessel; and a steam separation system according to one of the above described embodiments disposed over the core in the reactor pressure vessel.

At least one embodiment relates to a method of improving moisture removal.

In one embodiment, the method includes installing at least one moisture trap next to a steam dryer bank assembly.

In one embodiment, the method further includes installing at least one flow diverter on a steam separator.

BRIEF DESCRIPTION OF THE DRAWINGS

The various features and advantages of non-limiting example embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
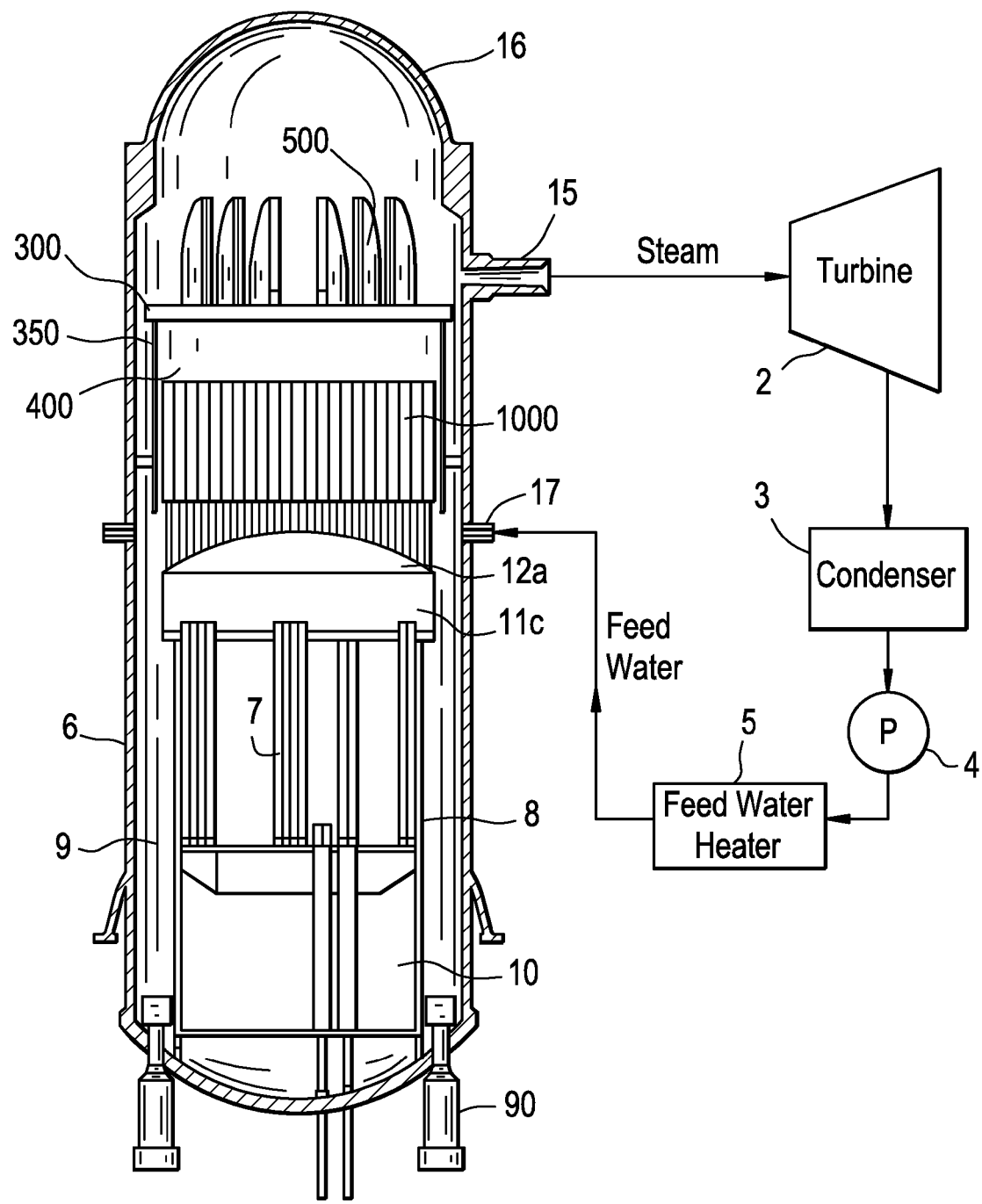
FIG. 1 is a cross-sectional view of a nuclear BWR according to an example embodiment.

It should be understood that when an element is referred to as being "on," "connected to," "coupled to," or "covering" another element, it may be directly on, connected to, coupled to, or covering the other element or intervening elements that may be present. In contrast, when an element is referred to as being "directly on," "directly connected to," or "directly coupled to" another element, there are no intervening elements present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 illustrates the structure of the nuclear BWR according to an example embodiment. In the nuclear BWR, a plurality of steam separators 1000 and a steam dryer system 500 having the structure described below are disposed in a dome 16 at the upper portion of the reactor pressure vessel 6. The following is a description of the structure inside the pressure vessel 6.

A cylindrical core shroud 8, which is concentric with the pressure vessel 6, is installed at a lower portion in the pressure vessel 6. A core lower plenum 10 is formed under the shroud 8 in the pressure vessel 6. A core 7 is disposed above this lower plenum 10 and surrounded by the shroud 8. There is also a core upper plenum 11c above the core 7. A shroud head 12a provided to the shroud 8 is disposed above the upper plenum 11c. It is to be noted that an annular space 9 is formed between the pressure vessel 6 and the shroud 8, and this functions as a circulation path for the light water coolant.

A prescribed number of holes (not shown) through which coolant passes are provided in the shroud head 12a. The plurality of steam separators 1000 are inserted into these holes and are aligned in parallel. The flow paths which join the core 7 and the steam separator 1000 are connected via the upper plenum 11c.

Also, a steam dryer system 500 is provided above the plurality of steam separators 1000. A support structure 300 (e.g., a support ring as shown), supports the steam dryer system 500 above the steam separators 1000 creating a dryer plenum 400 there between. A cylindrical dryer skirt 350, connected to the support ring, extends downward from the support ring 300. A feed water inlet nozzle 17 and a steam outlet nozzle 15 are provided at the side wall of the pressure vessel 6. Recirculation pumps 90 are provided at the lower portion of the reactor pressure vessel 6.

In the nuclear BWR, the wet steam generated in the core 7 by heating light water flows in each of the steam separators 1000 mounted on the shroud head 12a via the upper plenum 11c as a two-phase flow including the light water. In the steam separators 1000, the introduced gas-liquid two-phase FS passes through from the downward direction to the upward direction. Steam containing moisture that could not be removed is supplied to the steam dryer system 500 positioned above the steam separator 1000.

The steam (saturated steam) from which moisture is further removed by the steam dryer system 500 is exhausted from the steam outlet nozzle 15 and supplied to a turbine 2. This steam drives the turbine 2, which rotates a generator (not shown) joined to the turbine 2, and thereby power is generated. The steam exhausted from the turbine 2 is condensed at the condenser 3 and becomes condensed water. The condensed water, that is, the cooling water (light water) is supplied to a feed water heater 5 by a feed water pump 4. The cooling water heated by the feed water heater 5 is re-introduced to the pressure vessel 6 from the feed water nozzle 17.

Meanwhile, the water separated by the steam separator 1000 is mixed with the cooling water supplied from the feed water inlet nozzle 17 and descends the annular space 9 and is introduced to the core 7 via the lower plenum 10. At this time, the cooling water supplied to the core 7 is pressurized by a pump 90, which can be either internal or external to the nuclear BWR.

Figure 2:
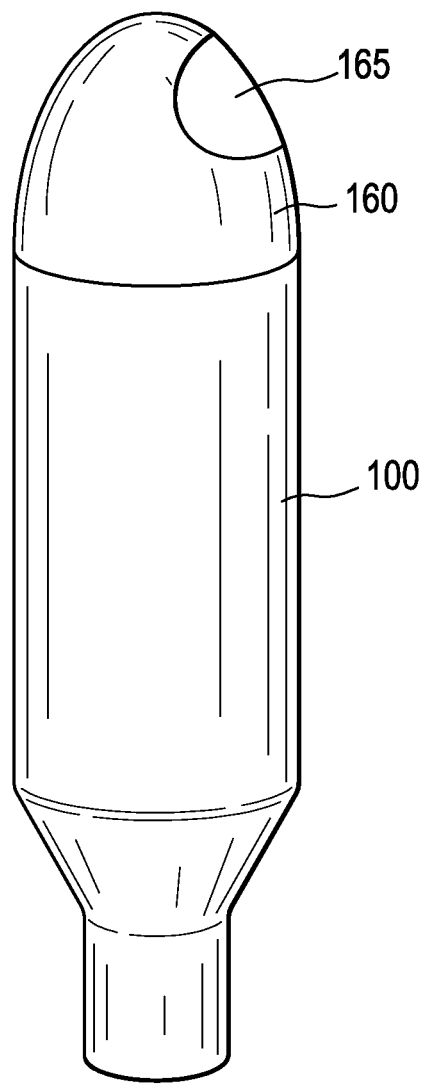
FIG. 2 is a longitudinal perspective view of one of the steam separators according to an example embodiment.

FIG. 2 is a longitudinal perspective view of one of the steam separators 1000 according to an example embodiment. It will be appreciated that each of, or some of, the plurality of steam separators 1000 may have the structure shown in FIG. 2.

In an example embodiment, the steam separator 1000 includes a main body 100 and a flow diverter 160 installed at an exit of the main body 100. The main body 100 may be any well-known steam separator such as the steam separator disclosed in U.S. application Ser. No. 14/157,966 entitled STEAM SEPARATOR AND NUCLEAR BOILING WATER REACTOR INCLUDING THE SAME, filed Jan. 17, 2014 by Ellison et. al., which is hereby incorporated by reference in its entirety. As will be appreciated, a gas-liquid two-phase FS, which is indicated by the arrow in FIG. 2, enters the main body 100. The gas of the gas-liquid two-phase FS may be steam, and the liquid of the gas-liquid two-phase FS may be water. As will be further appreciated, the main body 100 is configured to separate the liquid of the gas-liquid two-phase FS, and the separated liquid is mixed with the cooling water supplied from the feed water inlet nozzle 17 and descends the annular space 9 and is introduced to the core 7 via the lower plenum 10 (see FIG. 1).

The flow diverter 160, which is in the shape of a cylinder, is located at the exit of the body 100. The flow diverter 160 has an outlet 165 at the exit of the flow diverter 160. The flow diverter 160 has a 3-dimensional radius of curvature or inclined surface. The installation configuration of the radius of curvature of the flow diverter 160 allows for enhanced mixing of the gas-liquid two-phase FS in the dryer plenum 400 in order to improve liquid removal in the steam dryer system 500. The installation configuration of radius of curvature of the flow diverter 160 also allows for development of a swirl flow with a centrifugal force field as the gas-liquid two-phase FS travels upward from the steam separator 1000 to the steam dryer system 500 in order to improve liquid removal via moisture traps 600 described in greater detail below.

All steam separator components may be made of materials that are known to be acceptable for a nuclear environment. For instance, stainless steel (304, 316, XM-19, or equivalent) may be used.

Returning to FIG. 1, a steam dryer system 500 is located above the plurality of steam separators 1000 in an upper portion of the reactor pressure vessel 6. The steam dryer system 500 may be supported by a support ring 300 welded to a wall of the reactor pressure vessel 6 (see FIG. 1).

Figure 3:
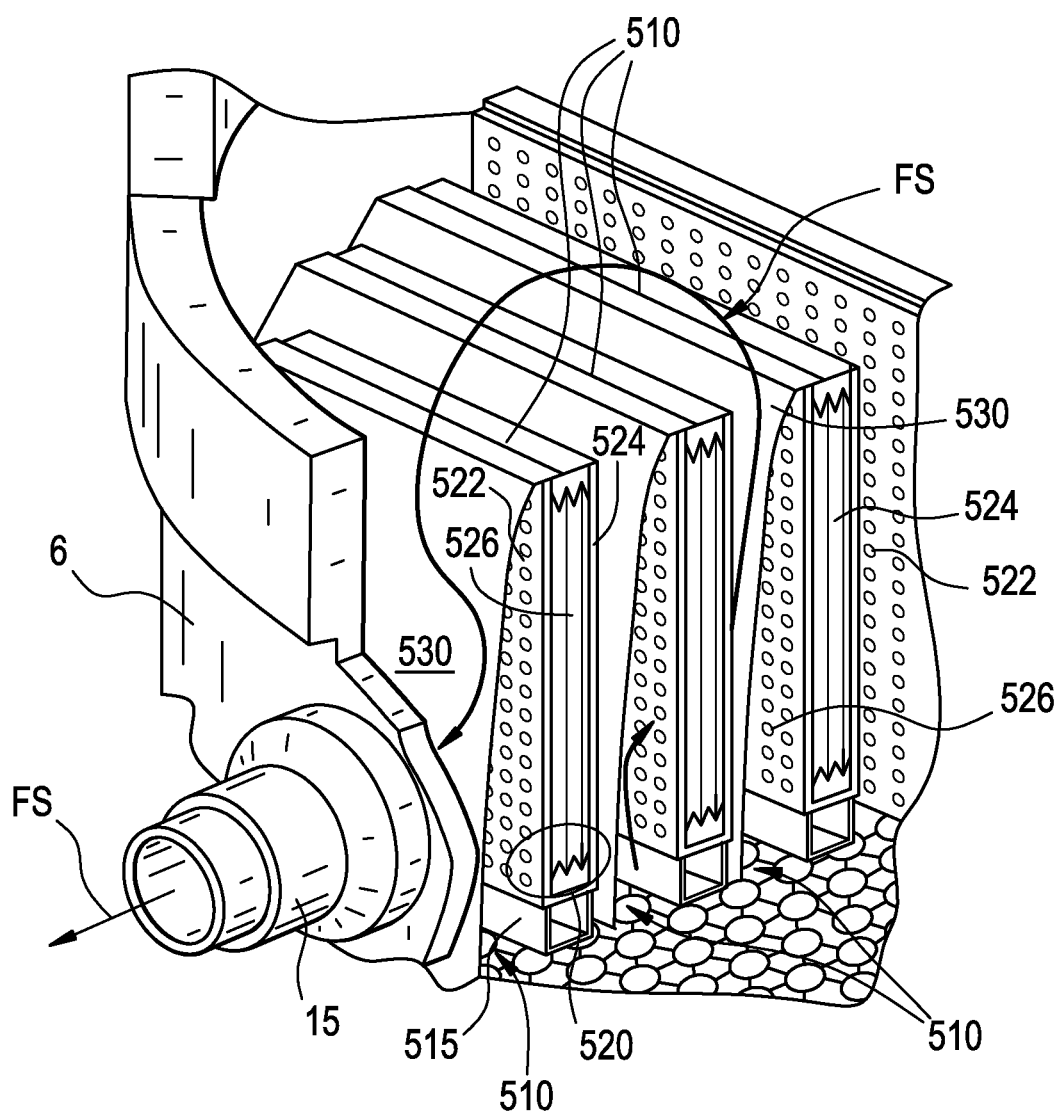
FIG. 3 is a partial cut-away view of the steam dryer system according to an example embodiment.

FIG. 3 is a partial cut-away view of the steam dryer system 500. As shown, a plurality of dryer bank assemblies 510 is arranged in parallel. Each dryer bank assembly 510 includes a vane assembly 520, a drain trough 515 and a hood panel 530. The drain troughs 515 are connected to the support ring 300, and this forms the main support structure for the steam dryer system 500. The drain troughs 515 are located below the vane assemblies 520 and provide a flow path for the water removed from steam by the vanes. Each vane assembly 520 includes inlet and outlet perforated plates 522 and 524 running parallel to one another, and welded to the vane assembly 520 and trough 515. The perforated plates 522 and 524 are spaced apart from one another. Pluralities of vanes 526, which are vertically oriented chevron plates, are tied together by horizontal tie rods (not shown) into a vane module. End plates (not shown) provide support for the tie rods.

Each dryer bank assembly 510 further includes a hood panel 530 that direct the gas-liquid two-phase FS from the steam separators 1000 through the respective dryer vane assembly 520. The hood panel 530 is connected to the top of the dryer vane assembly 520 and extends down to and separated from the drain trough 515. The vanes 526 remove the moisture from the gas-liquid two-phase FS. This moisture is collected in the drain troughs 515.

Figure 4:
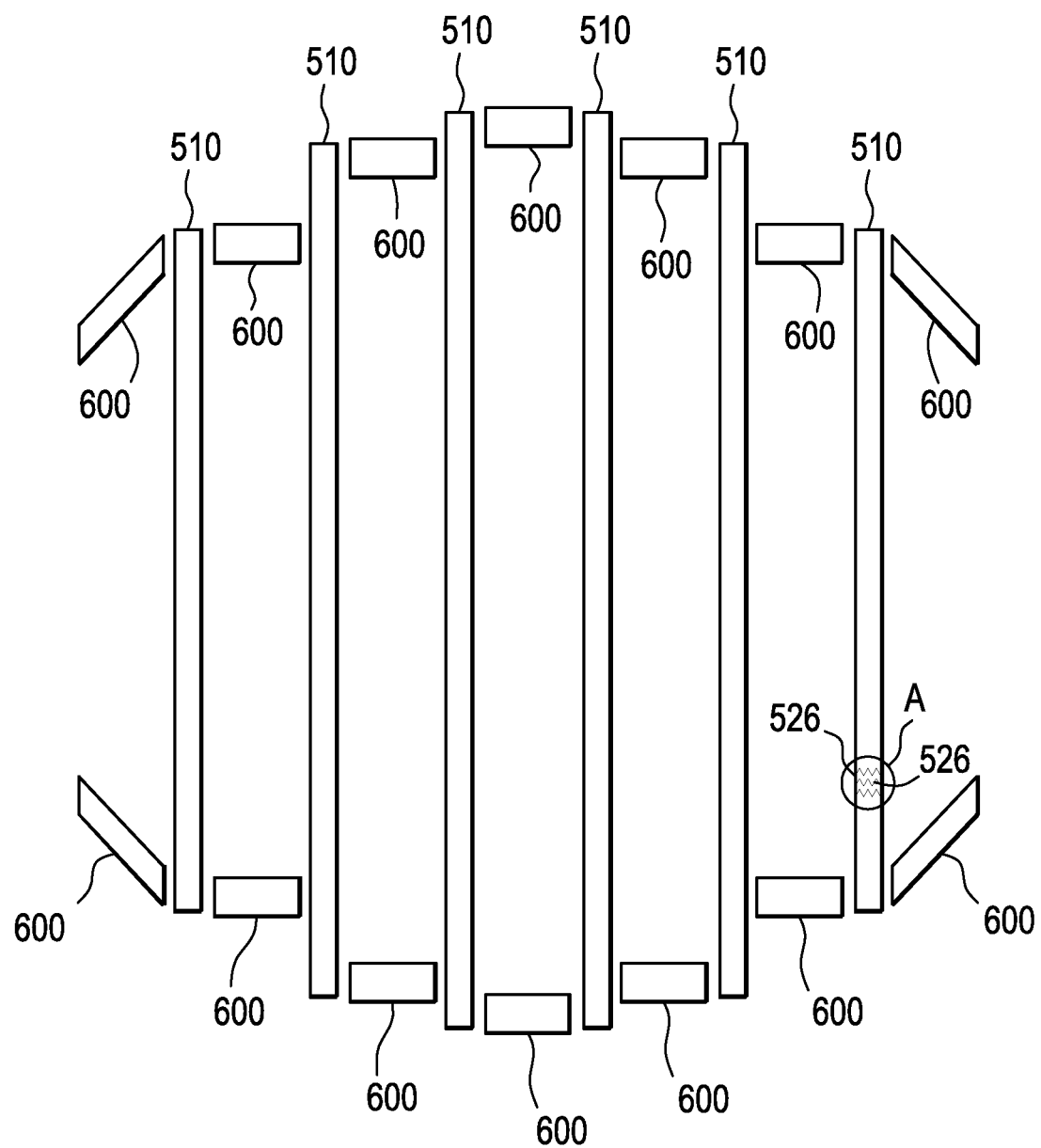
FIG. 4 illustrates a top down view of the steam dryer system shown in FIG. 1.

FIG. 4 illustrates a top down view of the steam dryer system 500. For the purposes of clarity, the hood panels 530 have been removed from the illustration in FIG. 4. As shown, the steam dryer system 500 includes a plurality of parallel steam dryer bank assemblies 510. For the purposes of clarity only, the circle A in FIG. 4 depicts the orientation of the chevron-shaped vanes 526.

The steam dryer system 500 additionally includes a plurality of moisture traps 600. At least one moisture trap is disposed at one of the ends of each steam dryer bank assembly 510. For example, in this embodiment, a moisture trap 600 is disposed at each end of each steam dryer bank assembly 510. Namely, in this embodiment, the moisture traps 600 are disposed substantially around the periphery of the steam dryer system 500 and therefore correspond to the projectional area above the periphery of the core 7. The moisture traps 600, as will be described below, are configured to further remove moisture from the gas-liquid two-phase FS.

As will be appreciated, depending on the design and configuration of fuel bundles in the core 7, greater amounts of liquid may be present in the gas-liquid two-phase FS corresponding to different areas of the core 7 exit. Accordingly, the moisture traps 600 may be strategically placed in association with the projectional areas of greater liquid content. Additionally, or alternatively, the flow diverters 160 of the steam separators 1000 may be positioned to direct the portions of the gas-liquid two-phase FS having greater moisture content towards a moisture trap 600. For example, low-leakage core designs and core designs that include one or more dummy bundles (e.g., bundles with little to no nuclear fuel for generating heat by a nuclear reaction) that do not generate significant amounts of heat such that the two-phase FS rising from the peripheral locations of the core 7 includes a greater amount of liquid than the two-phase FS rising from the center of the core 7.

Figure 5:
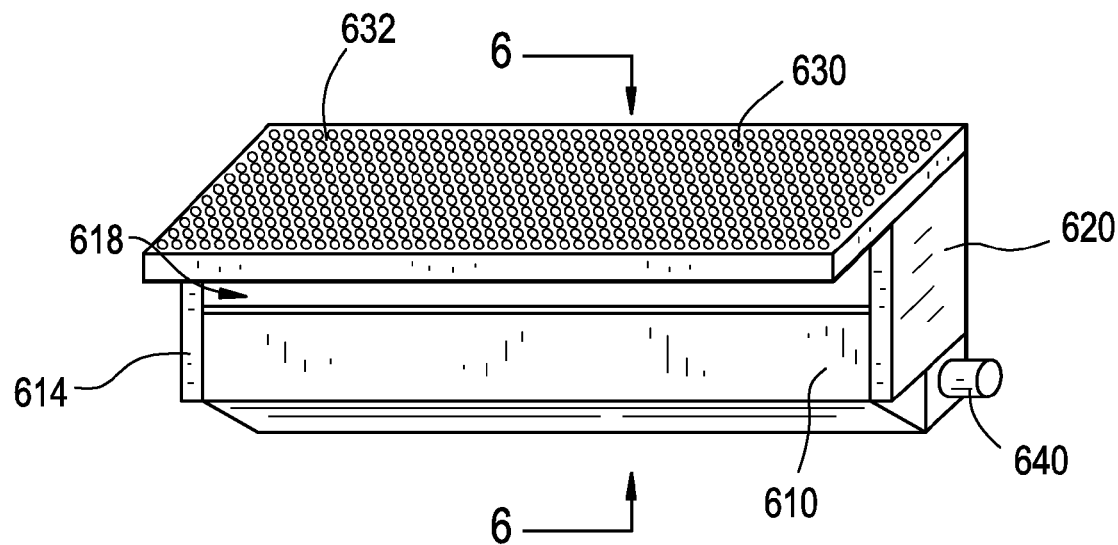
FIG. 5 illustrates an example embodiment of a moisture trap shown in FIG. 4.
Figure 6:
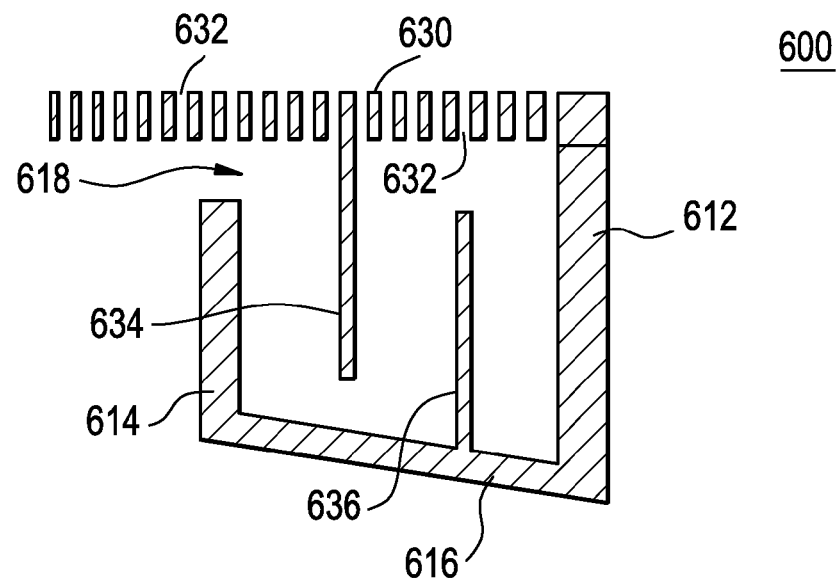
FIG. 6 illustrates a cross-section of the moisture trap in FIG. 5 taken along the line VI-VI in FIG. 5.

FIG. 5 illustrates an example embodiment of a moisture trap, and FIG. 6 illustrates a cross-section of the moisture trap in FIG. 5 taken along the line VI-VI in FIG. 5. As shown, the moisture trap 600 includes a rectangular box shaped housing 610. The housing 610 includes a cover or top wall 630, a back wall 612 parallel to a front wall 614, and bottom wall 616. The height of the back wall 612 is greater than the height of the front wall 614 such that (1) the bottom wall 616 of the housing is inclined, and (2) an inlet gap 618 exists between the top wall 630 and the front wall 614. Respective side walls 620 of the housing 610 seal the sides of the box and match the cross-sectional profile created by the back wall 612, the front wall 614, the bottom wall 616 and the top wall 630. At least one of the side walls 620 includes an exhaust port 640 for exhausting moisture trapped by the moisture trap 600.

The top wall 630 includes a plurality of orifices 632 having various sizes or diameters. For example, the orifices 632 closest to the interior surface of the steam dryer system 500 (see FIG. 4) may have a larger diameter than the orifices 632 furthest from the interior surface of the steam dryer system 500. Namely, the front wall 614 will generally face towards the center of the steam dryer system 500 and the back wall 612 will generally face towards the interior surface of the steam dryer system 500. The cover 630 may include one or more baffle plates 634 projecting down into the hollow interior of the housing 610. Similarly, the bottom wall 616 may include one or more baffle plates 636 extending up into the hollow interior of the housing 610. For purposes of illustration only, only one baffle plate associated with the top wall 630 and only one baffle plate associated with the bottom wall 616 are shown. The baffle plates 634 and 636 are separated from one another, and present the gas-liquid two-phase FS entering the steam dryer system 500 with a tortuous flow path that removes the residual moisture from the gas-liquid two-phase FS exiting the steam separator 1000 and returns the liquid to a respective drain trough 515 (as will be described below with respect to FIG. 7) via the exhaust port 640. The plates 634 and 636 may be rectangular shaped, but example embodiments are not limited thereto. The plates 634 and 636 may be the same length or have various lengths. The plates 634 and 636 may be the same width or have various widths. The plates 634 and 636 may be spaced apart by an equal distance or various distances.

The moisture traps 600 may be of various sizes and are configured to correspond with the space between the parallel dryer bank assemblies 510 as shown in FIG. 4. For example, the moisture traps 600 may be rectangular, trapezoidal, etc. in shape depending on the space available between the parallel dryer bank assemblies 510. Also, while the moisture trap 600 is a baffle-like assembly, example embodiments are not limited thereto.

Figure 7:
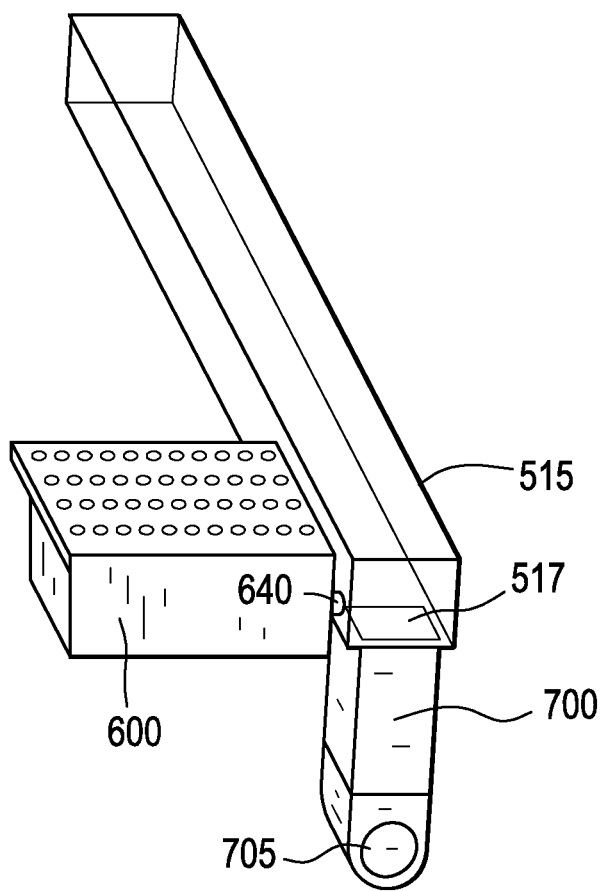
FIG. 7 illustrates the connection of a moisture trap to a drain trough of a steam dryer bank assembly.

FIG. 7 illustrates the connection of a moisture trap 600 to a drain trough 515 of a steam dryer bank assembly 510. As shown, a bottom surface of the moisture trap 600 coincides with a bottom surface of the drain trough 515. The exhaust port 640 protrudes into the drain trough 515. As will be appreciated, for pre-existing reactors, moisture traps 600 may be manufactured to fit between the steam dryer bank assemblies 510, and may be connected to pre-existing drain troughs 515. For example, holes may be drilled into the drain troughs 515 to accommodate the exhaust port 640. The exhaust port 640 and/or the moisture trap 600 may be connected to the drain trough 515 by welding. Similarly, for pre-existing reactors, flow diverters 160 may be welded onto pre-existing steam separators based on the position of the moisture traps 600 being installed.

As further shown in FIG. 7, a drain channel 700 is connected to the drain trough 515. For example, each drain trough 515 in the steam dryer system 500 may have one or more drain channels connected (e.g., welded) thereto. The drain trough 515 includes a hole 517 that allows fluid to drain though to the drain channel 700. In one embodiment, the drain channels 700 are positioned such that fluid exiting the drain channel flows outside of the dryer skirt 350 in FIG. 1. The drain channel 700 may be circular, rectangular, etc. in cross-section, and extend downward from the drain trough 515. Each drain channel 700 includes an exhaust hole 705 through which the fluid exits.

The interior surfaces of the flow diverter 160, the moisture trap 600 and the steam dryer system 500 exposed to the flow path are coated with an anti-fouling agent. The anti-fouling agent may be $TiO_2$, which is described in U.S. Patent Publication No. 2010/0055308, the entire contents of which are incorporated herein by reference.

All steam dryer components may be made of materials that are known to be acceptable for a nuclear environment. For instance, stainless steel (304, 316, XM-19, or equivalent) may be used.

Example embodiments thus being described, it will be appreciated by one skilled in the art that example embodiments may be varied through routine experimentation and without further inventive activity. Variations are not to be regarded as a departure from the spirit and scope of the example embodiments, and all such modifications as would be obvious to one skilled in the art are intended to be included within the scope of the following claims.

We claim:

1. A steam separation system disposed over a core in a reactor pressure vessel of a nuclear boiling water reactor, the steam separation system comprising:
    a plurality of steam separators configured to separate a first portion of a liquid from a first gas-liquid two-phase flow stream; and
    a steam dryer system above the steam separators, the steam dryer system including a plurality of steam dryer bank assemblies, and
    at least one moisture trap between adjacent ones of the plurality of the steam dryer bank assemblies, each of the steam dryer bank assemblies and the at least one moisture trap being configured to separate at least some of a liquid from a second gas-liquid two-phase flow stream exiting the steam separators, the at least one moisture trap including,
        a housing including a top outer wall having a plurality of orifices therethrough.

2. The system of claim 1, wherein an interior of the housing provides a tortuous flow path for the second gas-liquid two-phase flow stream.

3. The system of claim 2, wherein the housing is rectangular box shaped.

4. The system of claim 3, wherein the housing includes a front wall and a back wall, and a height of the front wall is less than a height of the back wall.

5. The system of claim 4, wherein the housing includes an inlet gap between the top wall and the front wall.

6. The system of claim 4, wherein sizes of the orifices in the top outer wall increase from the front wall to the back wall.

7. The system of claim 2, wherein the moisture trap includes at least one plate projecting from one of the top outer wall and a bottom outer wall of the housing into an interior of the housing to form the tortuous flow path.

8. The system of claim 7, wherein the at least one plate includes a first baffle plate and a second baffle plate, the baffle first plate projecting from the top outer wall and the second baffle plate projecting from the bottom outer wall, the second baffle plate being spaced apart from the first baffle plate.

9. The system of claim 2, wherein the housing includes a front wall and a back wall, and a size of each of the plurality the orifices in the top outer wall increase from the front wall to the back wall.

10. The system of claim 1, wherein the moisture trap includes an exhaust port, and the exhaust port connects to a drain trough of one of the steam dryer bank assemblies.

11. The system of claim 1, wherein the steam dryer system includes a plurality of moisture traps.

12. The system of claim 11, wherein the moisture traps are at respective ends of the steam dryer bank assemblies.

13. The system of claim 12, wherein at least one of the steam separators includes a flow diverter at an outlet thereof, the flow diverter configured to divert the second gas-liquid two-phase flow stream exiting the steam separator in a desired direction.

14. The system of claim 13, wherein the desired direction is towards one of the moisture traps.

15. The system of claim 13, wherein the flow diverter has a 3-dimensional surface with a radius of curvature.

16. The system of claim 13, wherein the interior surfaces of the flow diverter, the steam dryer bank assemblies and the moisture traps are coated with an anti-fouling agent.

17. The system of claim 1, wherein at least one of the steam dryer bank assemblies comprises:
- a drain trough;
- a vane assembly disposed on the drain trough, the vane assembly including chevron-shaped vanes configured to remove moisture from the second gas-liquid two-phase flow stream; and
- a hood panel configured to direct the second gas-liquid two-phase flow stream through the vane assembly.

* * * * *